US007728855B2

(12) United States Patent
Sakuma (10) Patent No.: US 7,728,855 B2
(45) Date of Patent: Jun. 1, 2010

(54) LIQUID CRYSTAL DISPLAY APPARATUS (75) Inventor: Kota Sakuma, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 1026 days.

(21) Appl. No.: 11/449,363

(22) Filed: Jun. 8, 2006

(65) Prior Publication Data
US 2006/0290835 A1 Dec. 28, 2006

(30) Foreign Application Priority Data
Jun. 20, 2005 (JP) ............................. 2005-179356

(51) Int. Cl.
G09G 3/36 (2006.01)
H04N 5/64 (2006.01)
G02F 1/1333 (2006.01)
G06F 1/16 (2006.01)

(52) U.S. Cl. .................. 345/905; 345/87; 348/794; 349/60; 361/679.21

(58) Field of Classification Search ............ 345/89; 348/790–794; 349/56–60, 104, 173–179; 361/679.3, 679.21, 679.27, 699.26
See application file for complete search history.

(56) References Cited

U.S. PATENT DOCUMENTS 7,327,430 B2 * 2/2008 Lee et al. ................... 349/150

FOREIGN PATENT DOCUMENTS

| JP | 2000-19491 | 1/2000 |
| JP | 2003-84261 | 3/2003 |
| JP | 2004-252185 | 9/2004 |
| JP | 2004-264342 | 9/2004 |

OTHER PUBLICATIONS

Patent Abstracts of Japan, Publication No. 2003-084261, Publication Date Mar. 19, 2003, 1 page.
Patent Abstracts of Japan, Publication No. 2000-019491, Publication Date Jan. 21, 2000, 1 page.
Patent Abstracts of Japan, Publication No. 2004-264342, Publication Date Sep. 24, 2004, 1 page.
Patent Abstracts of Japan, Publication No. 2004-252185, Publication Date Sep. 9, 2004, 1 page.
English Patent Abstract of JP2003084261 from esp@cenet database, 1 page.
English Patent Abstract of JP2000019491 from esp@cenet database, 1 page.
English Patent Abstract of JP2004264342 from esp@cenet database, 1 page.
English Patent Abstract of JP2004252185 from esp@cenet database, 1 page.

* cited by examiner

Primary Examiner—Bipin Shalwala
Assistant Examiner—Sosina Abebe
(74) Attorney, Agent, or Firm—Osha • Liang LLP (57) ABSTRACT On both sides of a resin-made frame, a metallic edge frame member that sandwiches a liquid crystal panel into the frame and a metallic backboard member equipped with a circuit board are disposed, and these are screw-fitted to the frame. On both sides sandwiching identical points of the flange of the frame, first projection pieces on the edge frame member side and second projection pieces on the backboard member 8 side are disposed, these respective projection pieces are fastened by screws made of headed screws, and by these respective projection pieces and and screws, earth conductive path that make the edge frame member electrically conduct to the backboard member are formed.

5 Claims, 6 Drawing Sheets

LIQUID CRYSTAL DISPLAY APPARATUS

CROSS-REFERENCE TO RELATED APPLICATIONS

This application is based on and claims the benefit of priority from the prior Japanese Patent Application No. 2005-179356, filed on Jun. 20, 2005; the entire contents of which are incorporated herein by reference.

BACKGROUND

1. Technical Field

The present invention relates to a liquid crystal display apparatus employed in, for example, a television receiver and particularly, to a liquid crystal display apparatus for which a measure for preventing static electricity of a human body from exerting an adverse effect on a liquid crystal panel, a control circuit board, and the like has been taken by making a metallic edge frame member (called as "a bezel") disposed around a liquid crystal panel electrically conductive to a metallic backboard member (called as "a rear frame") disposed behind the liquid crystal panel.

2. Description of Related Art

As a liquid crystal display apparatus used in the camera field, a technique for connecting the unit to an earth of the unit body via a conductive member disposed under a liquid crystal display has been known (see JP-A-2003-84261, for example) Moreover, in the same camera field, sandwiching a liquid crystal display panel between a front case and a rear case and forming an earth contact by disposing, on both these cases, conductive end faces that are in contact with each other to form an earth contact (see JP-A-2000-19491, for example), and in a small-sized liquid crystal display apparatus employed in a car navigation system, disposing a metallic cover and a backside case on both sides of a liquid crystal module and making an earth terminal provided on the metallic cover into elastic contact with an earth contact provided on a face of a liquid crystal display circuit (see JP-A-2004-264342, for example) have been known. Furthermore, in the camera field, a technique for fitting a display window of a cover into the periphery of an LCD panel of an LCD assembly placed on an electric wiring board and making an earth piece of a spring structure contact with an earth surface so as to apply pressure for preventing electrostatic discharge damage has also be proposed (see JP-A-2004-252185, for example)

The above-related arts merely propose countermeasures against static electricity for small-sized liquid crystal display apparatuses used for cameras and navigation systems, therefore, such techniques cannot be directly applied to liquid crystal display apparatuses for television receivers that are often constructed in larger sizes than the same. Namely, in a liquid crystal display apparatus with a size of 15 inches or 20 inches used for a television receiver or the like, a liquid crystal panel constructed by a liquid crystal module cannot be directly sandwiched by a front case and a rear case. Namely, in the liquid crystal panel used for a television receiver, since it becomes necessary to secure an installation space of a light source being a backlight in the rear of the liquid crystal panel and provide a structure for reinforcing the liquid crystal panel, it becomes necessary to provide a frame useful for these in the rear of the liquid crystal panel. A related art of this type of liquid crystal display device will be described in the following with reference to FIG. 6.

Figure 6:
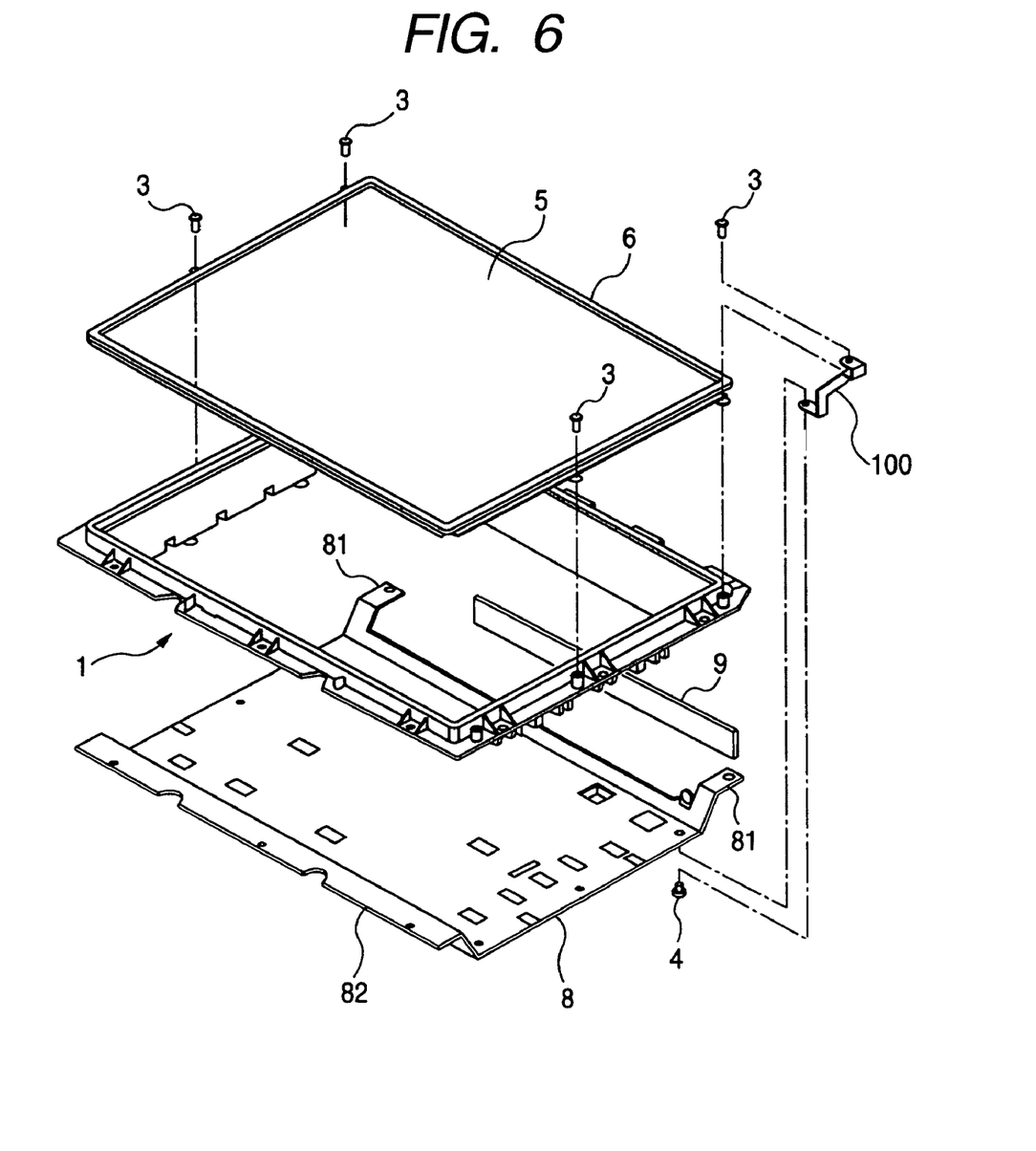
FIG. 6 is a schematic exploded perspective view of a main part of a liquid crystal display apparatus according to a related art.

FIG. 6 is schematic exploded perspective view of a main part of a liquid crystal display apparatus according to a related art. This liquid crystal display apparatus is disposed with, in a manner sandwiching a frame 1 made of a roughly rectangular loop-shaped resin molding, on both sides thereof, a metallic edge frame member (bezel) 6 that surrounds a liquid crystal panel 5 for a television receiver and sandwiches the liquid crystal panel 5 with the frame 1 and a backboard member (rear frame) 8 formed with a sheet metal thicker than the edge frame member 6, and on an outer surface side of the backboard member 8, a circuit board (unillustrated) used for, for example, driving the liquid crystal panel is mounted. And, the edge frame member 6 is fixed to the frame 1 by use of screws 3 at a plurality of points, and the backboard member 8 is likewise fixed to the frame 1 by use of unillustrated screws at a plurality of points. Also, in FIG. 6, reference numeral 9 denotes a relay board that is long sideways, and the relay board 9 is required for connecting the circuit board mounted on the backboard member 8 to electrodes of the liquid crystal panel 5, and is disposed along one side of the backboard member 8, specifically, an upper side portion.

In the liquid crystal display apparatus having the above construction, it has been known that, as a measure for preventing static electricity of a human body from jumping thereinto to exert an adverse effect on the liquid crystal panel 5, it is helpful to utilize the edge frame member 6 that fixes the liquid crystal panel 5 to the frame 1.

However, in an approximately 15-inch relatively small-sized liquid crystal display, electrodes (unillustrated) are positioned at an upper side portion of the liquid crystal panel 5, therefore, it is required to secure, at an upper side portion of the edge frame member 6, an installation space of a flexible wiring board (unillustrated) that connects the electrodes to the relay board 9. For this reason and others, as can be recognized in FIG. 6, the edge frame member 6 is screw-fitted to the frame 1 only at its left and right side portions. In contrast thereto, the backboard member 8 has mounting pieces 81 and 82 only at an upper side portion and a lower side portion thereof, in which a necessary mounting strength is secured by screw-fitting these mounting pieces 81 and 82 to the frame 1, no mounting pieces are provided at left and right side portions thereof to improve a material yield, whereby costs are reduced. Based on these facts, in order to collect static electricity of a human body at the edge frame member 6, release the same to the backboard member 8, and further release the same from the backboard member 8 to an earth pattern of the circuit board mounted thereon, it has been considered that an earth fitting 100 is inevitably required as extra.

Figure 7:
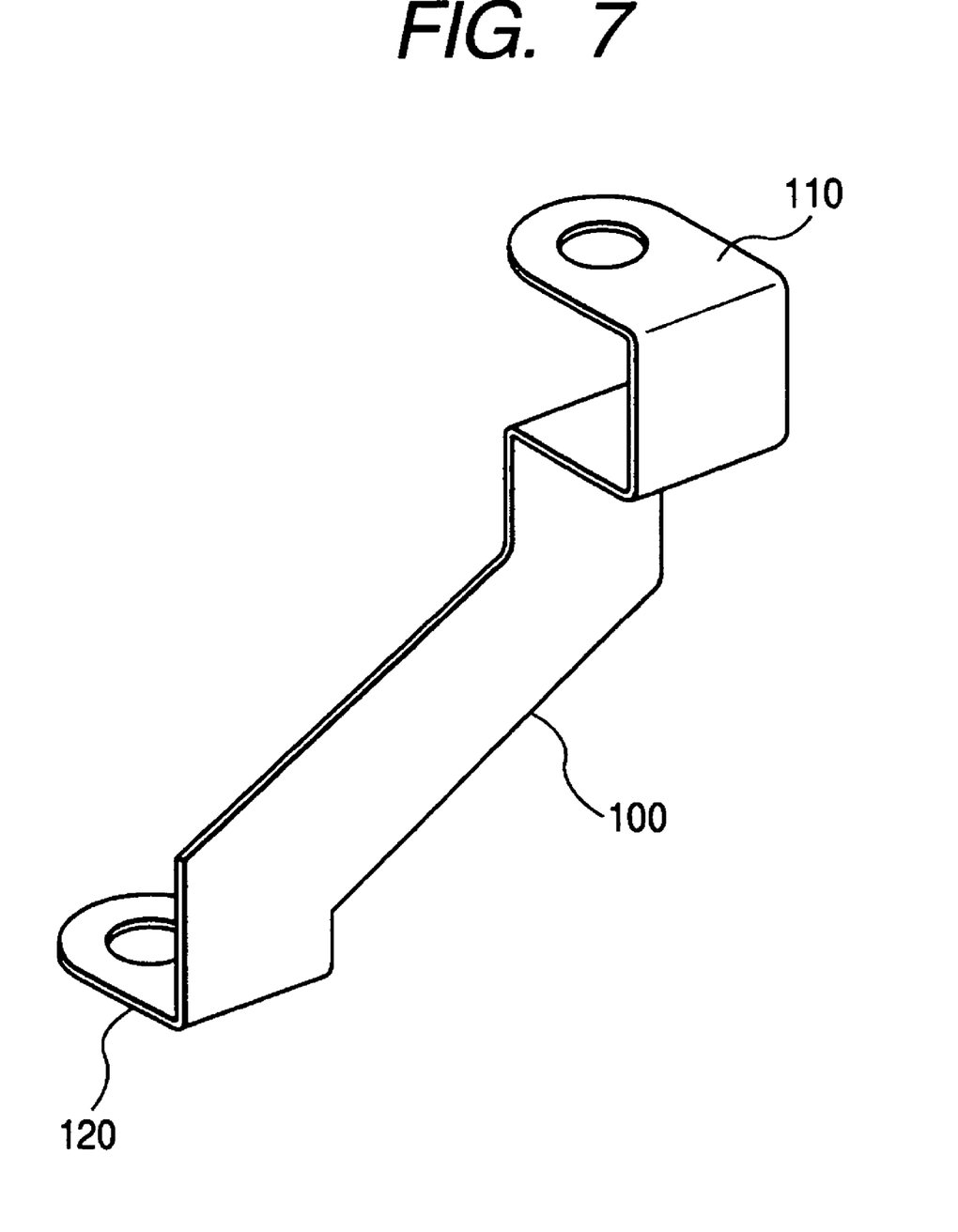
FIG. 7 is an enlarged perspective view of an earth fitting.

The earth fitting 100 is formed by bending a sheet metal into a complex shape as in FIG. 7, one end portion thereof 110 is concurrently clamped onto the edge frame member 6 by use of one of the screws 3, and the other end portion 120 is joined to the backboard member 8 by means of a screw 4 as shown in FIG. 6.

In the liquid crystal display apparatus with this construction, the edge frame member 6 is useful for preventing, when static electricity of a human body has jumped into an installation site of said liquid crystal display device, exertion of an adverse effect on the liquid crystal panel 5 by conducting the static electricity. Namely, when static electricity of a human body has jumped into an installation site of said liquid crystal display apparatus, the static electricity flows through an AC power cord after being conducted to the edge frame member 6, earth fitting 100, backboard member 8, and circuit board in this order, and is released to the ground side.

SUMMARY OF INVENTION

However, according to FIG. 6, even though the earth fitting 100 has been concurrently clamped onto the edge frame member 6 with the screw 3 for fixing the edge frame member 6 to the frame 1, the earth fitting 100 in a complex shape and the screw 4 that joins the earth fitting 100 to the backboard member 8 are necessary. Therefore, even when the mounting pieces have been eliminated from the left and right side portions of the backboard member 8 to improve a material yield thereof and costs have been thereby reduced as described above, since the earth fitting and screws for mounting the same are required as extra, the effect of cost reduction owing to the material yield of the backboard member 8 may be reduced by the components required as extra such as an earth fitting.

The present invention has been made in view of the above circumstances, and it is an object thereof to provide a liquid display unit that can prevent exerting an adverse effect on a liquid crystal panel by making it possible, when static electricity of a human body has jumped thereinto, to lead the static electricity from an edge frame member to a backboard member regardless of being able to eliminate the necessity of use an earth fitting and screws for mounting the earth fitting as extra.

In addition, it is an object of the present invention to provide a liquid crystal display apparatus that can prevent exerting an adverse effect on a liquid crystal panel by making it possible to lead static electricity from an edge frame member to a backboard member without using the components such as an earth fitting described above as extra even when the mounting pieces are eliminated from the left and right side portions of the backboard member as described above.

Furthermore, it is an object of the present invention to provide a liquid crystal display apparatus that can make it possible to form earth circuits that make an edge frame member electrically conductive to a backboard member by screws and utilize the screws for enhancing mounting strength of an edge frame member and a backboard member onto a frame.

Furthermore, it is an object of the present invention to provide a liquid crystal display apparatus that can effectively prevent an effect of static electricity on, particularly, an approximately 15-inch relatively small-sized liquid crystal panel without losing mounting strength onto the liquid crystal panel.

According to an aspect of the invention, a liquid crystal display apparatus comprises: a frame, a metallic edge frame member, and a metallic backboard member The frame is made of resin. The frame has a circular or rectangular shape. The frame has a flange which has through holes. The metallic edge frame member surrounds a liquid crystal panel. The metallic edge frame member sandwiches the liquid crystal panel with the frame . The metallic backboard member is equipped with a circuit board. The metallic backboard member can be screw-fitted to the frame. The metallic edge frame member and the metallic backboard member are screw-fitted to the frame. First projection pieces are provided consecutively to the metallic edge frame member. Second projection pieces are provided consecutively to the metallic backboard member. The first and second projection pieces are disposed on both sides sandwiching identical points of the flange of the frame. The first and second projection pieces are fastened onto the flange by screws inserted through through-holes of the flange. The respective first and second projection pieces and the screws form an earth conductive path that makes the metallic edge frame member electrically conductive to the metallic backboard member.

With this construction, when static electricity of a human body has jumped into an installation site of said liquid crystal display apparatus, since the static electricity flows to the edge frame member, and then is released to the backboard member through the earth circuits formed by the first and second mounting pieces and screws, it becomes possible to prevent an adverse effect owing to the static electricity being exerted on the liquid crystal panel. Accordingly, it becomes unnecessary to use the earth fitting 100 and screws for mounting the same described in terms of FIG. 6 and FIG. 7.

According to another aspect of the invention, screw insertion holes are opened in one of the first and second projection pieces. Screw holes are formed on the other one of the first and the second projection pieces. The screws made of headed screws inserted through the screw insertion holes and the through-holes are screwed into the screw holes at points where the respective first and second projection pieces and flange are at least partially overlapped. There is an advantage such that the screws required as extra are low in cost since these are general-purpose headed screws.

According to another aspect of the invention, the flange of the frame extends across four side portions thereof. The metallic edge frame member is individually screw-fitted to the flange on both sides of two side portions with respect to one opposite side direction of the frame. The metallic backboard member has mounting pieces only on both sides of the metallic backboard member in one opposite side direction thereof. The mounting pieces are individually screw-fitted to the flange on both sides of two side portions with respect to the other opposite direction of the frame. Accordingly, since no mounting pieces are provided for the backboard member on both sides in another opposite side direction thereof, a material yield of the backboard member is improved, and this remarkably promotes reduction in cost in combination with the low-cost construction of the earth circuits. The present invention can be advantageously applied to, particularly, a liquid crystal display apparatus that can secure a necessary mounting strength by screw-fitting mounting pieces provided only on two side portions of a backboard member to a frame, for example, a liquid crystal display apparatus employing an approximately 15-inch relatively small-sized liquid crystal panel.

According to another aspect of the invention, the liquid crystal display apparatus further includes a relay board connecting the circuit board to an electrode of the liquid crystal panel. The relay board is disposed along the one side of the metallic backboard member in one opposite side direction thereof. The second projection pieces are provided consecutively to the other side of the metallic backboard member on the other opposite side direction thereof. Accordingly, static electricity that has flowed to the edge frame member flows in a direction to distance itself from the relay board, therefore, such a situation that static electricity is collected around the relay board to exert an adverse effect is relieved. In other words, static electricity releasing efficiency is improved.

According to another aspect of the invention, a function to screw-fit the metallic edge frame member and the metallic backboard member to the flange is given to the screws forming the earth conductive path. Accordingly, it becomes possible to improve mounting strength of the edge frame member and backboard member to the frame without increasing the number of points to screw-fit these to the flange.

A liquid crystal display apparatus includes: a frame made of resin, a metallic edge frame member, a metallic backboard member. The frame has a circular or rectangular shape. The frame has a flange extending across four side portions thereof. The flange has through-holes. The metallic edge frame member surrounds a liquid crystal panel for a television receiver. The metallic edge frame member sandwiches the liquid crystal panel with the frame. The metallic backboard member is made thicker than the metallic edge frame member, and equipped with a circuit board. The metallic backboard member can be screw-fitted to the frame. The metallic edge frame member and the metallic backboard member are made electrically conductive by an earth fitting which is individually screw-fitted thereto. The metallic edge frame member is individually screw-fitted to the flange on both sides of two side portions with respect to one opposite side direction of the frame. The metallic backboard member has mounting pieces only on both sides of the metallic backboard member in one opposite side direction thereof. The mounting pieces are individually screw-fitted to the flange on both sides of two side portions with respect to the other opposite direction of the frame. The liquid crystal display apparatus further comprises: a relay board connecting the circuit board to an electrode of the liquid crystal panel. The relay board is disposed along the one side of the metallic backboard member in one opposite side direction thereof. First projection pieces are provided consecutively to the metallic edge frame member. Second projection pieces are provided consecutively to the other side of the metallic backboard member in one opposite side direction thereof. The first and second projection pieces are disposed on both sides sandwiching identical points of the flange, instead of omitting both the earth fitting and a mounting screw fitting the earth fitting to both the metallic edge frame member and the metallic backboard member. Screws made of headed screws inserted through screw insertion holes opened in the first projection pieces and the through-holes are screwed into screw holes formed on the second projection pieces. The metallic edge frame member and the metallic backboard member are fastened by the screws onto the flange to be screw-fitted to the flange by the screws. The respective first and second projection pieces and the screws form earth conductive path that make the metallic edge frame member electrically conductive to the metallic backboard member.

BRIEF DESCRIPTION OF THE DRAWINGS

These and other objects and advantages of this invention will become more fully apparent from the following detailed description taken with the accompanying drawings in which.

DESCRIPTION OF THE EMBODIMENTS

Figure 1:
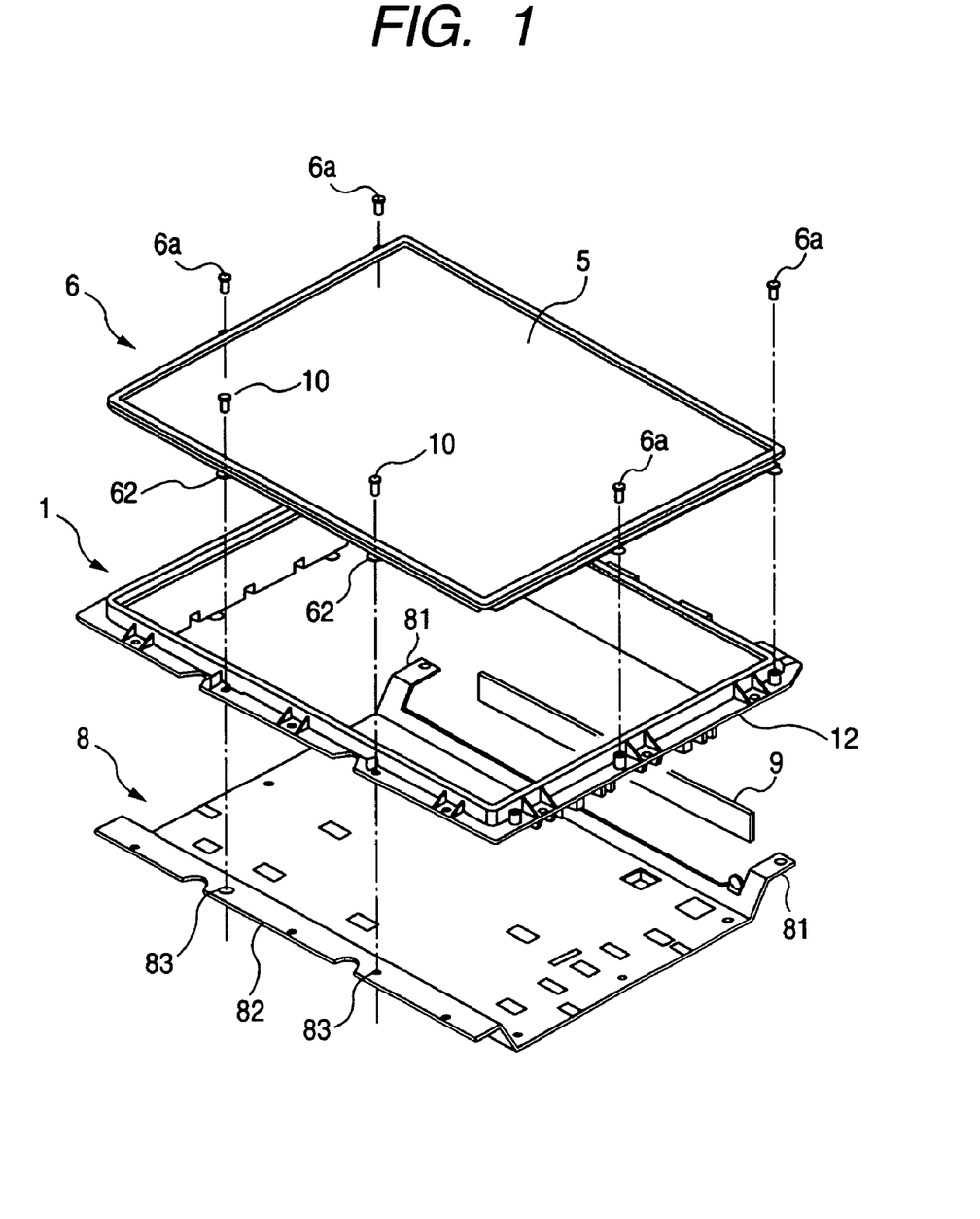
FIG. 1 is a schematic exploded perspective view of a main part of a liquid crystal display apparatus according to an embodiment.
Figure 2:
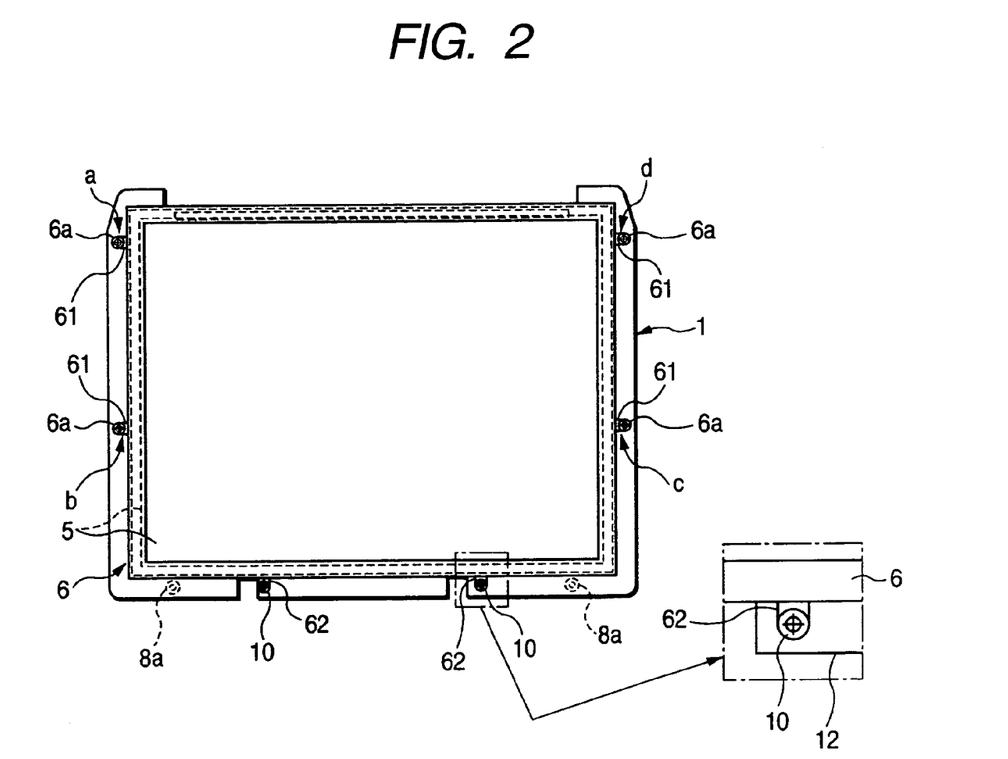
FIG. 2 is a front view of the same liquid crystal display apparatus according to the embodiment.
Figure 3:
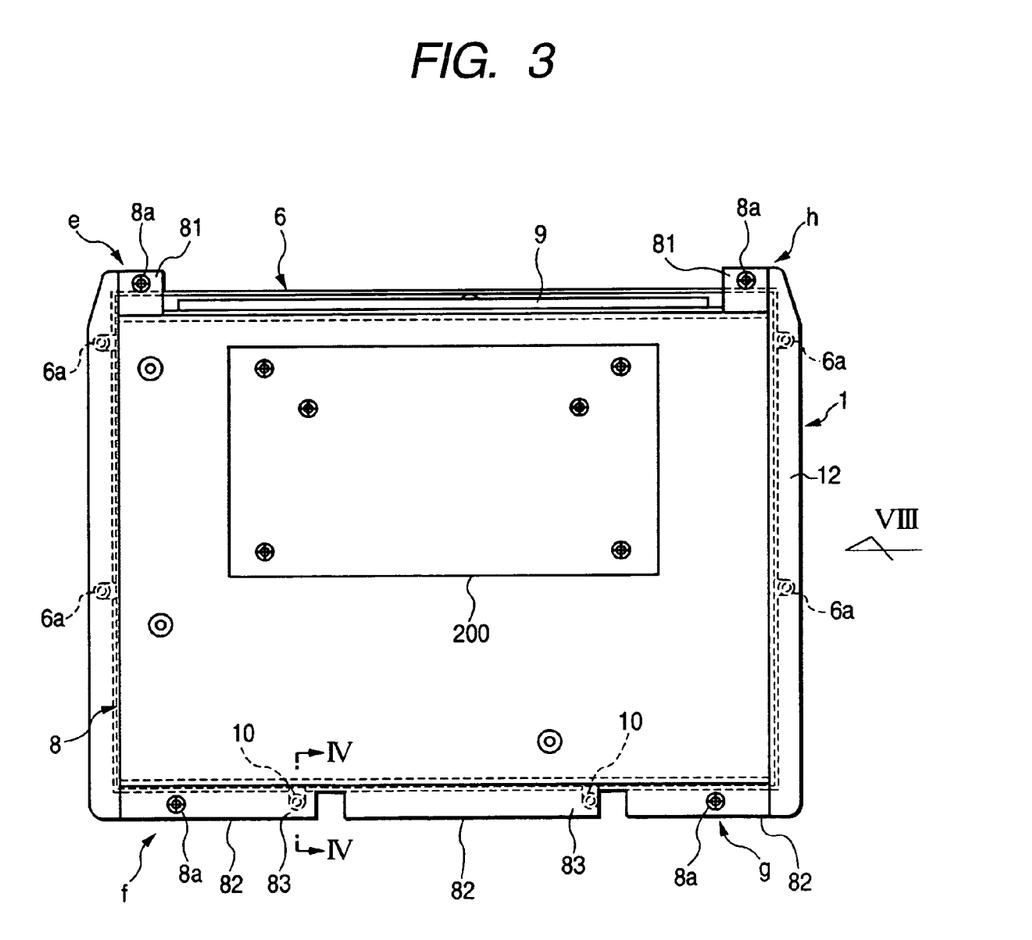
FIG. 3 is a rear view of the same liquid crystal display apparatus according to the embodiment.
Figure 4:
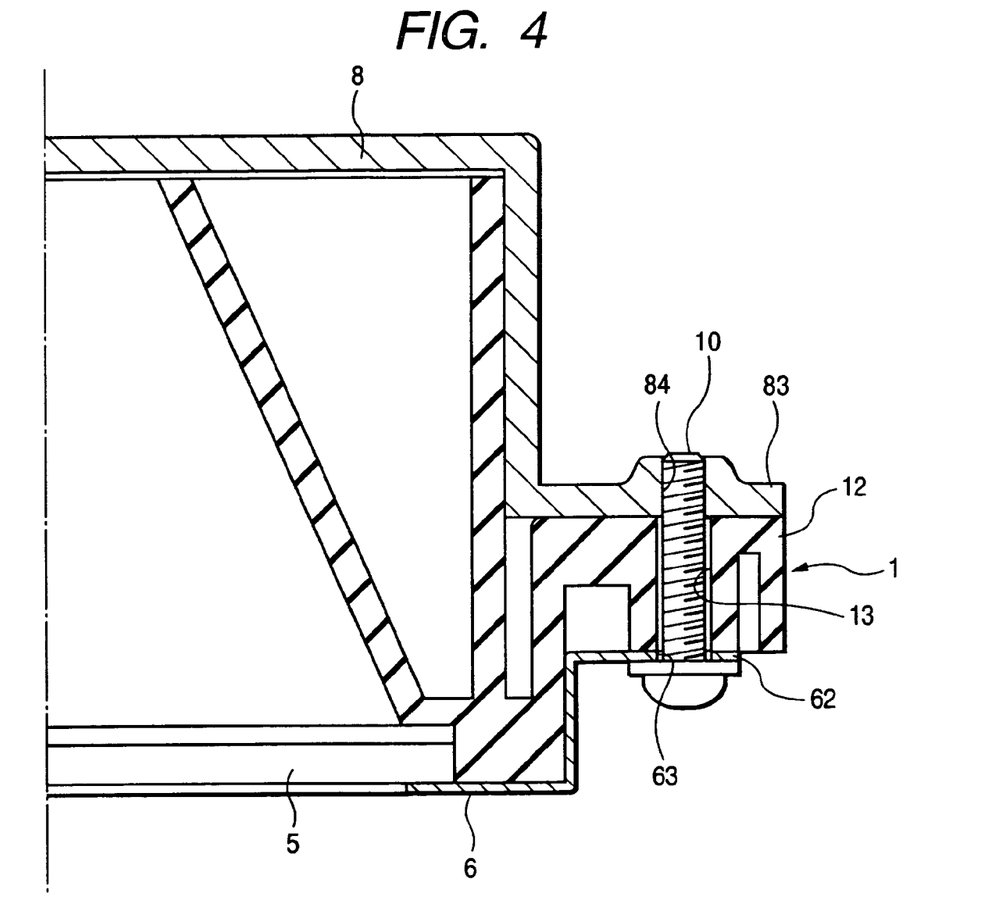
FIG. 4 is an enlarged cross-sectional view of a part along a line V-V of FIG. 3.
Figure 5:
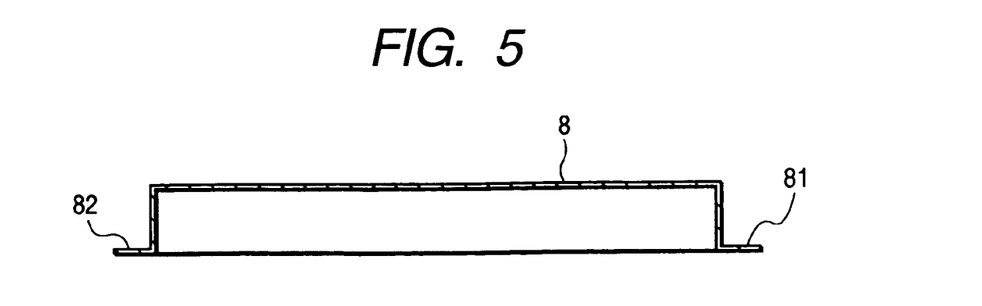
FIG. 5 is a horizontal cross-sectional view of a backboard member from an arrow VIII direction of FIG. 3.

FIG. 1 is a schematic exploded perspective view of a main part of a liquid crystal display apparatus according to an embodiment, FIG. 2 is a front view of the same liquid crystal display apparatus, FIG. 3 is a rear view of the same liquid crystal display apparatus, FIG. 4 is an enlarged cross-sectional view of a part along a line V-V of FIG. 3, and FIG. 5 is a horizontal cross-sectional view of a backboard member from an arrow VIII direction of FIG. 3.

The liquid crystal display apparatus according to the present embodiment is formed for a television receiver using a rectangular liquid crystal panel 5 made of an approximately 15-inch relatively small-sized liquid crystal module, includes, as in FIG. 1, as main components thereof, a resin-made frame 1 shaped in a roughly loop form, a metallic edge frame member 6, and a metallic backboard 8, and does not necessitate the earth fitting 100 and screws 3 and 4 for mounting the same shown in FIG. 6 and FIG. 7.

The frame 1 has a flange 12 that extends across four side portions, and as shown in FIG. 2 and FIG. 3, for an upper side part and a left side part of the flange 12, center parts thereof have been chipped off except for both ends.

The edge frame member 6 is shaped in a rectangular loop form, respective side portions of which have L-shaped cross-sectional shapes, fitted into the periphery of the liquid crystal panel 5 placed over the frame 1 to surround the whole of the liquid crystal panel 5 (see FIG. 4), and is screw-fitted to the flange 12 of the frame 1 at four points of a, b, c, and d shown in FIG. 2 in left and right respective side portions of the frame 1. At these screw-fitting points a to d, mounting screws 6a inserted through screw insertion holes of tongue-shaped mounting pieces 62 provided consecutively to left and right side portions of the edge frame member 6 and protruded to the outer side are screwed and tightened into screw holes formed on the flange 12. By this construction, the liquid crystal panel 5 is sandwiched between the frame 1 and edge frame member 6 and is fixed to the frame 1. Here, the respective left and right side portions of the frame 1 are equivalent to two side portions on both sides in one opposite side direction of the frame 1.

The backboard member 8 formed in a roughly rectangular form is fabricated by bending a flat plate material as in FIG. 1 or FIG. 5. In addition, the backboard member 8 includes mounting pieces 81 and 82 only at an upper side portion and a lower side portion thereof, and for the mounting piece 81 at the upper side portion, a center part thereof has been chipped off except for both ends thereof. And, this backboard member 8 is, at an opposite side of the edge frame member 6 across the frame 1, screw-fitted to the flange 12 at four points of e, f, g, and h shown in FIG. 3 in left and right respective side portions of the frame 1. Of these screw-fitting points e to h, at upper left and right screw-fitting points e and h, mounting screws 8a inserted through screw insertion holes of the mounting piece 81 are screwed and tightened into screw holes formed on the flange 12 in an upper side portion of the frame 1, and at lower left and right screw-fitting points f and g, mounting screws 8a inserted through screw insertion holes of the mounting piece 82 are screwed and tightened into screw holes formed on the flange 12 in a lower side portion of the frame 1. Here, the upper side portion and lower side portion of the frame 1 are equivalent to two side portions on both sides in another opposite side direction of the frame 1.

Meanwhile, since the liquid crystal display device of the present embodiment has been formed as one for a television receiver using the rectangular liquid crystal panel 5 made of an approximately 15-inch relatively small-sized liquid crystal module as described above, the backboard member 8 has also been formed in a size corresponding thereto. Therefore, mounting strength of this backboard member 8 to the frame 1 is sufficiently secured by only providing the four upper and lower screw-fitting points e, f, g, and h as in FIG. 3. Consequently, in this backboard member 8, the mounting pieces 81 and 82 are provided only at the upper side portion and lower side portion thereof, mounting pieces are eliminated from the left and right side portions to improve a material yield, and material and production costs are thereby reduced. Here, other points of the backboard member 8 may be screw-fitted to the frame 1 if necessary.

As in FIG. 3, on the outer surface side of the backboard member 8, a control circuit board 200 for driving the above-described liquid crystal panel 5 is mounted, and the circuit board 200 and electrodes (unillustrated) arranged at the upper end and side ends of the liquid crystal panel 5 are connected via a relay board 9 long sideways installed in a space (chip-off point of the mounting piece 81) between the left and right mounting pieces 81 and 81 at the upper side portion of the backboard member 8. As such, since it is necessary for the backboard member 8 to have been provided with rigidity sufficiently great to secure mounting strength of the circuit board 200 and the like, the backboard member 8 is fabricated with a flat plate material thicker than the above-described edge frame member 6.

Next, the first projection pieces 62 provided consecutively to the edge frame member 6 as in FIG. 2 and second projection pieces 83 formed by a part identical to a part that forms the lower mounting piece 82 of the backboard member 8 as in FIG. 3 are disposed in the lower side portion of the frame 1 on both sides sandwiching identical points of the flange 12. And, as in FIG. 4, into screw holes 84 formed on the second projection pieces 83, screws 10 made of general-purpose headed screws inserted through screw insertion holes 63 opened in the first projection pieces 62 and through-holes 13 opened in the flange 12 have been screwed. These screws 10 not only form earth circuits that make the edge frame member 6 electrically conduct to the backboard member 8 in cooperation with the first projection pieces 62 and second projection pieces 83 but also display an effect to fasten the edge frame member 6 and backboard member 8 onto the flange 12 to screw-fit the same to the flange 12. In this instance, since the screw holes 84 into which the screws 10 have been screwed and tightened have been formed on the second projection pieces 83 of the backboard member 8 thicker than the edge frame member 6, a sufficient tightening force is obtained by the screws 10, thus there is an advantage such that the edge frame member 6 and backboard member 8 are tightly mounted on the flange 12.

According to the liquid crystal display apparatus constructed as in the above, static electricity of a human body that has jumped into an installation site of said liquid crystal display apparatus flows to the edge frame member 6 without exerting an adverse effect on the liquid crystal panel 5, circuit board 200, relay board 9, and the like, is released from the edge frame member 6 to the backboard member 8 through the earth circuits formed by the screws 10, first projection pieces 62, and second projection pieces 83, and is further released from the backboard member 8 to the ground side through an earth pattern of the circuit board 200. Accordingly, although the earth fitting 100 and the screws 3 and 4 for mounting the same described in terms of FIG. 6 and FIG. 7 are omitted, no adverse effect owing to the static electricity is exerted on the liquid crystal panel 5 and the like. Particularly, in the present embodiment, the relay board 9 is disposed along the upper side portion of the backboard member 8, whereas the earth circuits formed by the screws 10, first projection pieces 62, and second projection pieces 83 are provided in the lower side portion of the backboard member 8 on the opposite side thereto, so that static electricity that has flowed to the edge frame member 6 flows in a direction to distance itself from the relay board 9. Therefore, such a situation that static electricity is collected around the relay board 9 to exert an adverse effect is relieved to improve static electricity releasing efficiency.

In the above, although the liquid crystal display apparatus for a television receiver with an approximately 15-inch relatively small-sized liquid crystal panel 5 has been illustrated, as a matter of course, it is possible to apply the same construction as the embodiment to a liquid crystal display apparatus of a television receiver with a 20-inch large-sized liquid crystal panel and a liquid crystal display apparatus of other audio-video equipment.

According the embodiment, since earth circuits are formed by only fastening and fixing the first mounting pieces provided on the edge frame member and second mounting pieces provided on the backboard member to the flange of the frame with the screws, and it becomes possible to release static electricity flowed to the edge frame member via the earth circuits, therefore, even when the earth fitting and screws for mounting the same described in terms of FIG. 6 are omitted, an adverse effect owing to static electricity is hardly exerted onto the liquid crystal panel. Accordingly, it becomes possible for a user to use the liquid crystal display apparatus without feeling worried about static electricity of the user him/herself exerting an adverse effect on the liquid crystal panel. In addition, when the earth fitting and screws for mounting the same are omitted, the number of required components is reduced corresponding thereto, and costs can be more easily reduced by that much, and particularly, in a case where mounting pieces have been provided consecutively to the backboard member in only two side portions and mounting pieces have been eliminated from the other two side portions so as to improve a material yield of the backboard member, it becomes possible to remarkably reduce the costs in combination with that the backboard member can be fabricated at low cost. Moreover, it is possible to utilize the screws forming the above-described earth circuits for improving mounting strength of the edge frame member and backboard member to the frame, and one constructed as such has an advantage such that mounting strength of the frame member and backboard member without increasing the number of screws used to mount these to the frame.

What is claimed is:

1. A liquid crystal display apparatus comprising:
   a frame made of resin, the frame having a rectangular shape, the frame having a flange extending across four side portions thereof, and the flange having through-holes;
   a metallic edge frame member surrounding a liquid crystal panel for a television receiver, the metallic edge frame member sandwiching the liquid crystal panel with the frame, and
   a metallic backboard member made thicker than the metallic edge frame member and equipped with a circuit board, the metallic backboard member capable of being screw-fitted to the frame,
   wherein the metallic edge frame member and the metallic backboard member are made electrically conductive by an earth fitting which is individually screw-fitted thereto,
   wherein the metallic edge frame member is individually screw-Pitted to the flange on both sides of two side portions with respect to one opposite side direction of the frame,
   wherein the metallic backboard member has mounting pieces only on both sides of the metallic backboard member in one opposite side direction thereof,
   wherein the mounting pieces are individually screw-fitted to the flange on both sides of two side portions with respect to the other opposite direction of the frame, and
   the liquid crystal display apparatus further comprising:

a relay board connecting the circuit board to an electrode of the liquid crystal panel, the relay board disposed along one side of the metallic backboard member in the one opposite side direction thereof, wherein first projection pieces are provided consecutively to the metallic edge frame member, wherein second projection pieces are provided consecutively to the other side of the metallic backboard member in the one opposite side direction thereof, wherein the first and second projection pieces are disposed on both sides sandwiching identical points of the flange, instead of omitting both the earth fitting and a mounting screw fitting the earth fitting to both the metallic edge frame member and the metallic backboard member, wherein screws made of headed screws inserted through screw insertion holes opened in the first projection pieces and the though-holes are screwed into screw holes formed on the second projection pieces, wherein the metallic edge frame member and the metallic backboard member are fastened by the screws onto the flange to be screw-fitted to the flange by the screws, and wherein the respective first and second projection pieces and the screws form earth conductive path that make the metallic edge frame member electrically conductive to the metallic backboard member.

2. A liquid crystal display apparatus comprising:

a frame made of resin, the frame having a rectangular shape, the frame having a flange which has through holes;

a metallic edge frame member surrounding a liquid crystal panel, the metallic edge frame member sandwiching the liquid crystal panel with the frame;

a metallic backboard member equipped with a circuit board, the metallic backboard member capable of being screw-fitted to the frame; and a relay board connecting the circuit board to an electrode of the liquid crystal panel, wherein the metallic edge frame member and the metallic backboard member are screw-fitted to the frame, wherein first projection pieces are provided consecutively to the metallic edge frame member, wherein second projection pieces are provided consecutively to the metallic backboard member, wherein the first and second projection pieces are disposed on both sides sandwiching identical points of the flange of the frame, wherein the first and second projection pieces are fastened onto the flange by screws inserted through through-holes of the flange, wherein the respective first and second projection pieces and the screws form an earth conductive path that make the metallic edge frame member electrically conductive to the metallic backboard member, wherein the relay board is disposed along one side of the metallic backboard member in one opposite side direction thereof, and wherein the second projection pieces are provided consecutively to the other side of the metallic backboard member on the one opposite side direction thereof.

3. The liquid crystal display apparatus according to claim 2, wherein screw insertion holes are opened in one of the first and second projection pieces, wherein screw holes are formed on the other one of the first and the second projection pieces, and wherein the screws made of headed screws inserted through the screw insertion holes and the through-holes are screwed into the screw holes at points where the respective first and second projection pieces and flange are at least partially overlapped.

4. The liquid crystal display apparatus according to claim 2, wherein the flange of the frame extends across four side portions thereof, wherein the metallic edge frame member is individually screw-fitted to the flange on both sides of two side portions with respect to one opposite side direction of the frame, wherein the metallic backboard member has mounting pieces only on both sides of the metallic backboard member in the one opposite side direction thereof, wherein the mounting pieces are individually screw-fitted to the flange on both sides of two side portions with respect to the other opposite direction of the frame.

5. The liquid crystal display apparatus according to claim 2, wherein a function to screw-fit the metallic edge frame member and the metallic backboard member to the flange is given to the screws forming the earth conductive path.

* * * * *